United States Patent
Moser et al.

[11] Patent Number: 5,998,758
[45] Date of Patent: Dec. 7, 1999

[54] LASER SOLDERING HEAD IN AN AUTOMATIC SOLDERING INSTALLATION

[75] Inventors: Peter Moser, Ipsach; François Candolfi, Nidau; Claude-Alain Knuchel, Péry, all of Switzerland

[73] Assignee: MTA Automation AG, Brugg, Switzerland

[21] Appl. No.: 08/909,702

[22] Filed: Aug. 12, 1997

[30] Foreign Application Priority Data

Aug. 20, 1996 [CH] Switzerland .................. 1996 2036/96

[51] Int. Cl.$^6$ ................................................. B23K 26/00
[52] U.S. Cl. .............................. 219/121.63; 219/121.75
[58] Field of Search ..................... 219/121.63, 121.64, 219/121.65, 121.66, 121.75, 121.73, 121.6

[56] References Cited

U.S. PATENT DOCUMENTS

| | | |
|---|---|---|
| 4,899,924 | 2/1990 | Kawaguchi . |
| 5,122,635 | 6/1992 | Knodler et al. ..................... 219/121.63 |
| 5,371,337 | 12/1994 | Campbell et al. ................. 219/121.63 |
| 5,525,777 | 6/1996 | Kukuljian . |
| 5,653,381 | 8/1997 | Azdasht ................... 228/254 |

FOREIGN PATENT DOCUMENTS

| | | |
|---|---|---|
| 0 199 590 | 10/1986 | European Pat. Off. . |
| 3905684 | 9/1990 | Germany . |
| 4200548 | 5/1993 | Germany . |
| 62-292266 | 12/1987 | Japan .................................. 219/121.64 |
| 2-92452 | 7/1990 | Japan .................................. 219/121.66 |
| 3-27886 | 2/1991 | Japan . |
| 4-361887 | 12/1992 | Japan . |
| 7-314163 | 12/1995 | Japan . |

*Primary Examiner*—Gregory Mills
*Attorney, Agent, or Firm*—Foley & Lardner

[57] ABSTRACT

An automatic soldering installation includes a soldering head (10) which is composed of a connecting element (11), a soldering wire dispenser (12), focusing optics (13), and an actuator (24). The soldering head (10) is mounted on the arm of a robot (16) which allows to position it in such a manner that the soldering wire (14) is positioned in the area of a respective soldering point (19). The focusing optics (13) is connected to a laser (21) by an optical fiber (22) and operates to focus the free laser beam (15) on the soldering point (19). The actuator (24), which is controlled by a control system (25), allows to vary the distance between the focusing optics (13) and the soldering point (19) independently from the robot (16), and thus to vary the width of the laser beam (15) at the soldering point (19). A more uniform temperature distribution on soldering points (19) of different sizes is thus obtained. The control systems (17, 23, 25) of the robot (16), of the laser (23), and of the actuator (24), respectively, cooperate in order to supply an optimal amount of energy for each soldering operation in every case.

8 Claims, 6 Drawing Sheets

LASER SOLDERING HEAD IN AN AUTOMATIC SOLDERING INSTALLATION

BACKGROUND OF THE INVENTION

The invention refers to a soldering head which is intended to be used in conjunction with a robot as an automatic soldering installation including at least a soldering wire dispenser, a focusing optics for a laser beam which is connected to an optical fiber, and a connecting element allowing a rigid mechanical connection of said soldering wire dispenser and said focusing optics in such a manner that the end of the soldering wire is in the area of the free, focused laser beam and is capable of being positioned in the area of a respective soldering point.

Automatic soldering installations are known. They serve to rationalize soldering techniques and operate on the basis of robots or fully automated systems. Installations are known whose soldering technique is either based on conventional soldering irons or on high-frequency soldering irons, on microflame soldering, or on induction soldering. Furthermore, installations are known where the soldering is effected by means of a controlled laser beam.

As an example of the latter case, amongst others, an installation is available where a Nd:YAG laser having an output power of 50 watts is used. The energy of this laser is conducted to the soldering point by means of a lightguide and a focusing optics. The combination of different lightguides and focusing optics allows the device to cover a wide field of applications for different soldering operations. In this known device, a diameter of the focal point between 300 and 1500 μm is selected by variation of the focal length, which is about 50 to 150 mm. These different possibilities allow reaching soldering points which are difficult or impossible to reach by soldering techniques of another kind.

The advantage of laser soldering techniques is that they offer a good stability of the laser source as well as the possibility to modulate the beam in almost any manner by means of different pulse types. If the different parameters are adjusted correctly, this results in a very high quality of the soldering points and to an excellent repeatability of the soldering process. A further advantage is that the energy distribution is point-shaped and that the components are not contacted. This allows the exclusion of a large number of possible error sources and saves the workpiece, e.g. an integrated semiconductor element IC.

As an inconvenience of the described technique, it has been found that the differences in the sizes of the soldering points, which alternate randomly in the soldering sequence, are difficult to take into account in the programming of an automatic soldering installation, thereby influencing the soldering speed and the quality of the produced soldering points. It is therefore an object of the invention to improve the known laser soldering technique to eliminate the mentioned inconvenience.

SUMMARY OF THE INVENTION

This object is attained by a soldering head comprising a controllable actuator which is independent from said robot and allows variation of the geometrical relationship between said soldering wire dispenser and said focusing optics for adaptation of the spot size which is illuminated by the laser beam to the size of the respective soldering point.

BRIEF DESCRIPTION OF THE DRAWINGS

The invention is explained in more detail hereinafter by means of six figures.

DETAILED DESCRIPTION OF THE INVENTION

Figure 1:
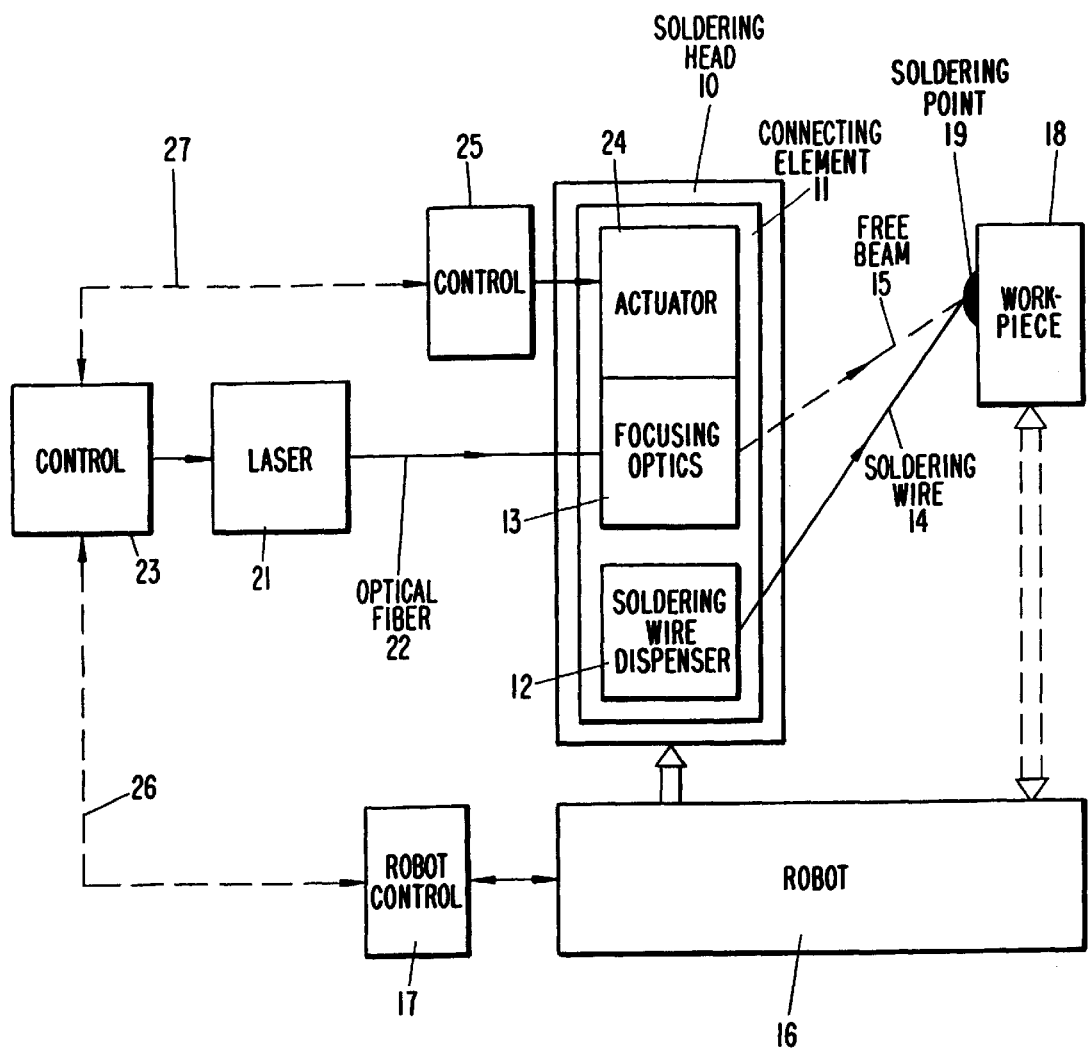
FIG. 1 shows the block diagram of a laser soldering installation.

FIG. 1 shows the block diagram of a laser soldering installation. This installation includes a soldering head 10 according to the invention which is composed of a connecting element 11, a soldering wire dispenser 12, a focusing optics 13, and an actuator 24. Soldering head 10 is mounted on the arm of a robot 16 and can be positioned in such a manner that the soldering wire 14 dispensed from the soldering wire dispenser 12 by means of a not shown motor, is brought into the area of the intended soldering point 19. This soldering point 19 is a part of a workpiece 18, e.g. a semiconductor element, to be soldered to a circuit board. Possibly, workpiece 18 may also be manipulated by roboter 16, which is symbolized by a dotted double arrow.

Focusing optics 13 of soldering head 10 is coupled to a laser 21, e.g. a Nd:YAG laser of about 50 watt in a conventional manner, e.g. by an optical fiber 22. For the control of the momentarily output soldering power, a control 23 is provided which is programmable according to the soldering requirements. Likewise, robot 16 is controlled by an associated robot control 17 and cooperates with the above-mentioned control 23 of the laser, which is represented by a dotted double arrow 26. Focusing optics 13 serves the purpose of focusing the laser beam which is supplied by laser 21 and through optical fiber 22 and which is directed into the area of the soldered point 19 in the form of a free beam 15. The distance between focusing optics 13 and soldering point 19 approximately corresponds to the focal length of the focusing optics, so that a small light spot corresponding to the focusing condition impinges on the soldering point 19. Herewith it is not necessary that laser beam 15 impinges on workpiece 18 orthogonally, which is indicated in the block diagram by a non-horizontal line 15. The hitherto discussed assembly according to FIG. 1 is essentially known and conventional.

A novel feature is particularly actuator 24, which is connected to focusing optics 13 in a mechanically rigid manner. Associated to actuator 24 is a control 25 which cooperates with laser control 23 (equal to control of robot 16), and which is represented by a dotted double arrow 27. By means of control 25, actuator 24 allows a mechanical displacement of focusing optics 13 independently from the movement of robot 16. This displacement serves to defocus the free laser beam 15. By this, a light spot is produced whose size corresponds to the right size at each soldering point 19. This adapted soldering light spot, allows a more uniform heating of the soldering point 19 improving the soldering result. In order to ensure a sufficient supply of the required energy by laser 21, it is necessary to deliver a control signal to laser control 23 by line 27 which indicates the position of the focusing optics, i.e. of actuator 24. Laser control 23 is thus capable of adapting the amount of energy automatically to the size of the actual soldering point 19 in each case. It will be noted in this context that it is not the position of soldering wire 14 which is modified by actuator 24 but the geometrical relationship between soldering wire dispenser 12 and focusing optics 13, i.e. the distance between the focal point of laser beam 15 and the end of the soldering wire.

Figure 2:
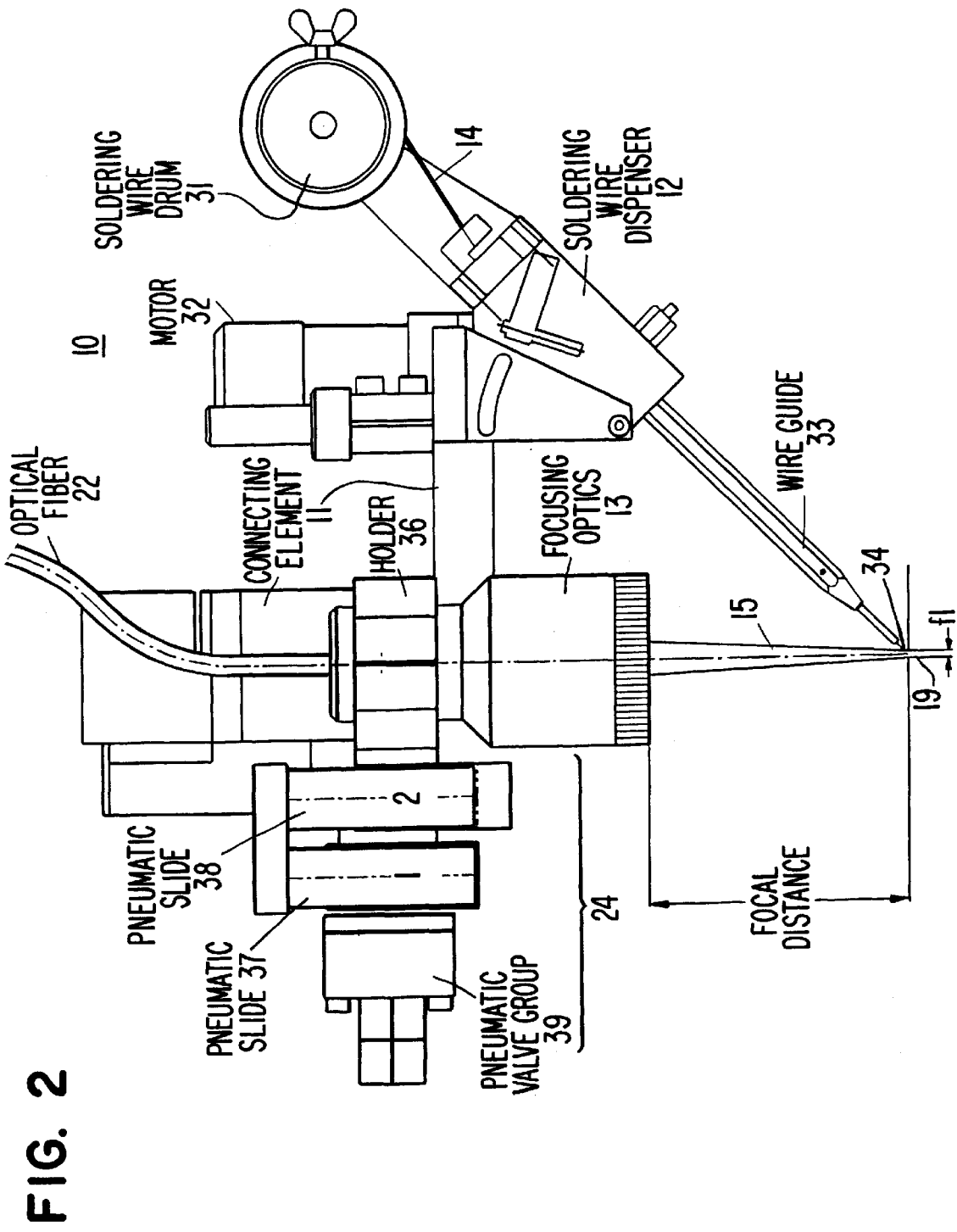
FIGS. 2 to 5 show different positions of a detailed first embodiment of a laser soldering head.

FIG. 2 shows a side elevation of a detailed soldering head 10. As already described with reference to FIG. 1, this soldering head comprises a connecting element 11, a soldering wire dispenser 12, and a focusing optics 13. Filler wire dispenser 12 is composed of a holder for a soldering wire drum 31, a motor 32 for the transport of the soldering wire, and of a wire guide 33 in the form of a tube which guides the soldering wire to the soldering point. At the end of this wire guide 33, soldering wire 14 projects from this tube in the area of soldering point 19 and forms a soldering wire point 34.

On one of its sides, focusing optics 13 is connected to optical fiber 22. On its other side, it delivers the free laser beam 15 whose focal point coincides with soldering point 19 and with soldering wire point 34. The diameter of beam 15 at the soldering point 19 is designated by f1.

Figure 3:
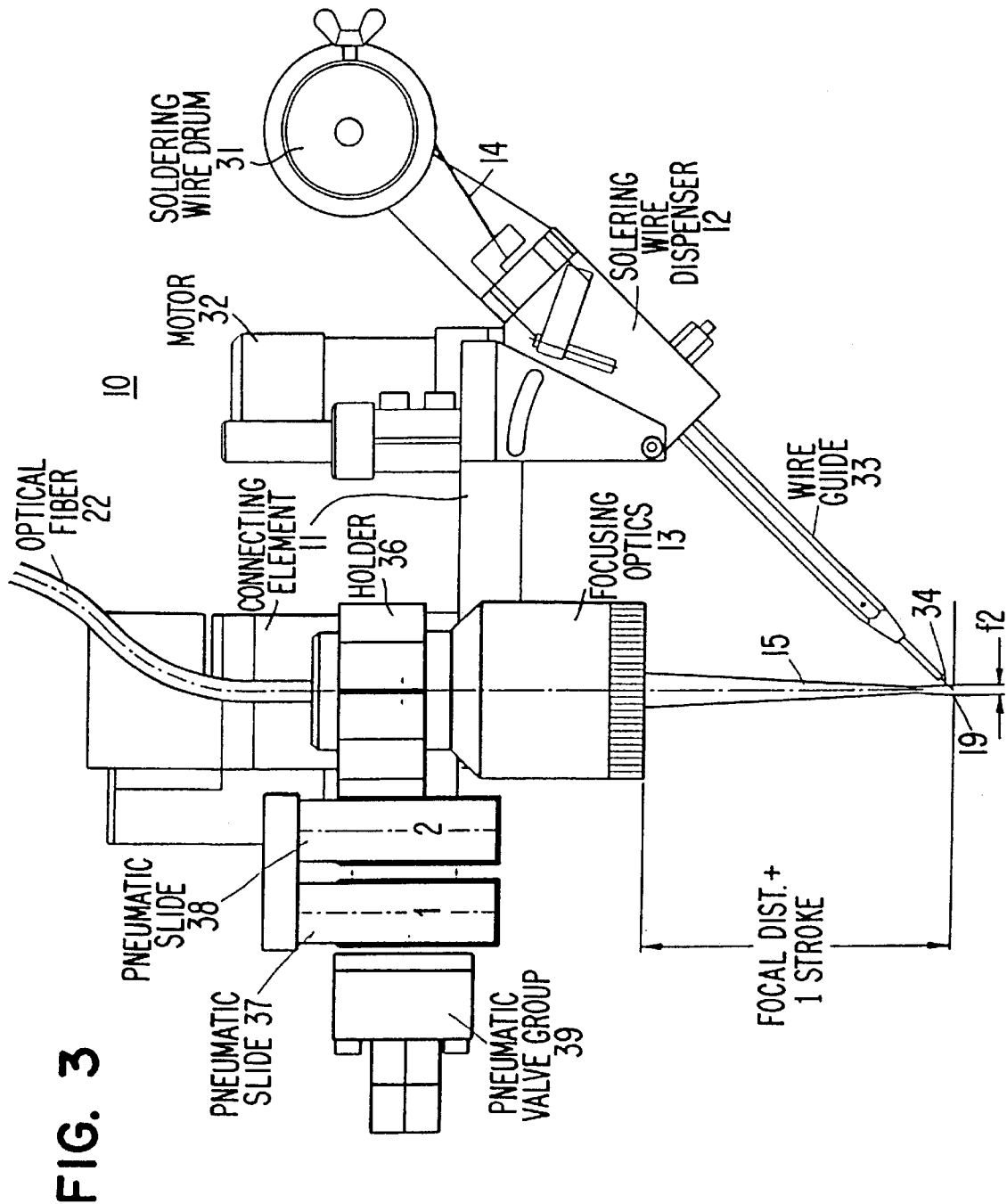
Figure 4:
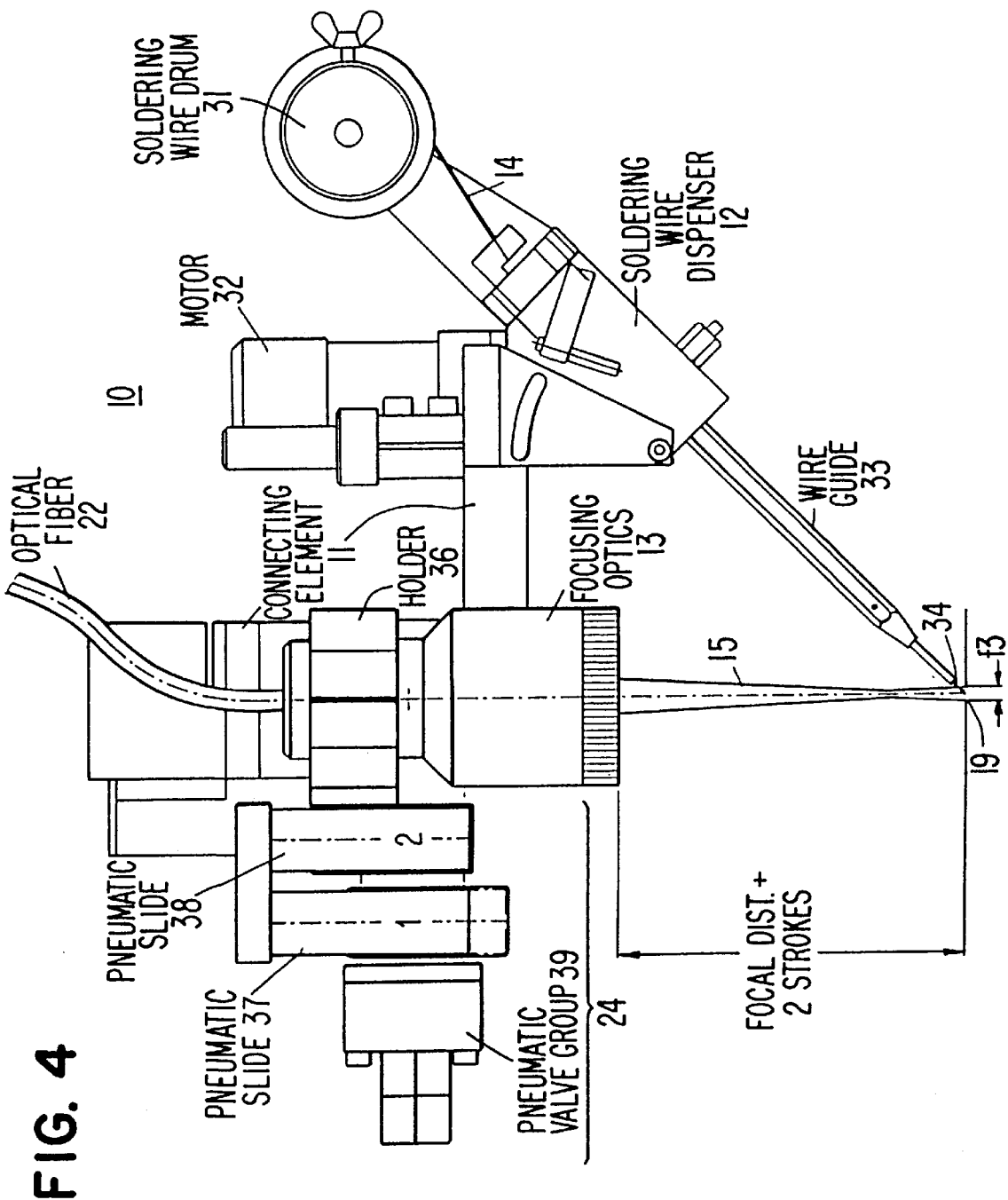

Focusing optics 13 is connected to actuator 24 by means of a holder 36. The actuator is composed of two pneumatic slides 37 and 38 which are controlled by a pneumatic valve group 39. Pneumatic slides 37, 38 are via valve group 39 staggered positionable from one of their end positions to their respective second end position. Thereby, focusing optics 13 can assume a total of three stable positions. The views of FIGS. 3 and 4, which are essentially identical to FIG. 2, show the working positions of focusing optics 13 obtained in this manner. Since a displacement of focusing optics 13 by pneumatic slides 37, 38 has no influence on the optical system as such, the focal point of free laser beam 15 is displaced along with the optical system. This results in an enlarged light spot on soldering point 19. In this manner, a light spot of three different sizes f1, f2 resp. f3 is producible at the potential soldering point independently from the movement of robot 16 in a simple way by a single control signal. Meanwhile, point 34 of soldering wire 14 stays stable in its position.

Connecting element 11 is a stable mechanical device which joins focusing optics 13 to soldering wire dispenser 12. Its construction is as desired and adapted to its purpose.

Figure 5:
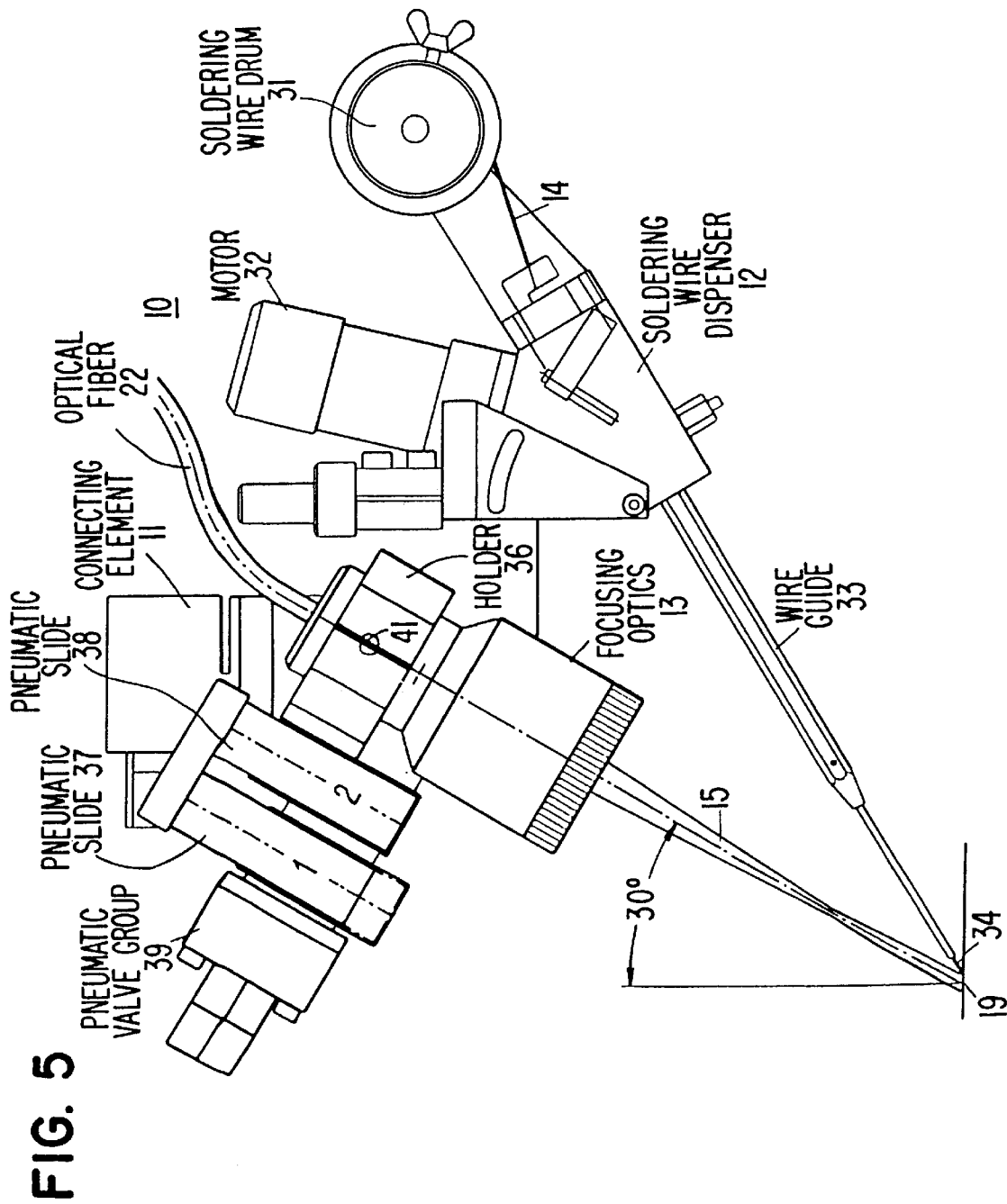

FIG. 5 shows another view of soldering head 10. In this view, as compared to the representations of FIGS. 2 to 4, focusing optics 13 is pivoted 30° from the vertical position. This pivoting movement is effected together with the pivoting of pneumatic slides 37, 38, around a substantial or a virtual axis 41. This allows an oblique irradiation of the soldering points 19 from above, which may be advantageous for reasons of accessibility. In this case, care will be taken that soldering wire dispenser 12 resp. wire guide 23 must be correspondingly pivoted in their positions, of course, in such a manner that the free laser beam 15 is again in the area of soldering wire point 34. Furthermore, it is understood that angles differing from the mentioned 30° are possible.

Figure 6:
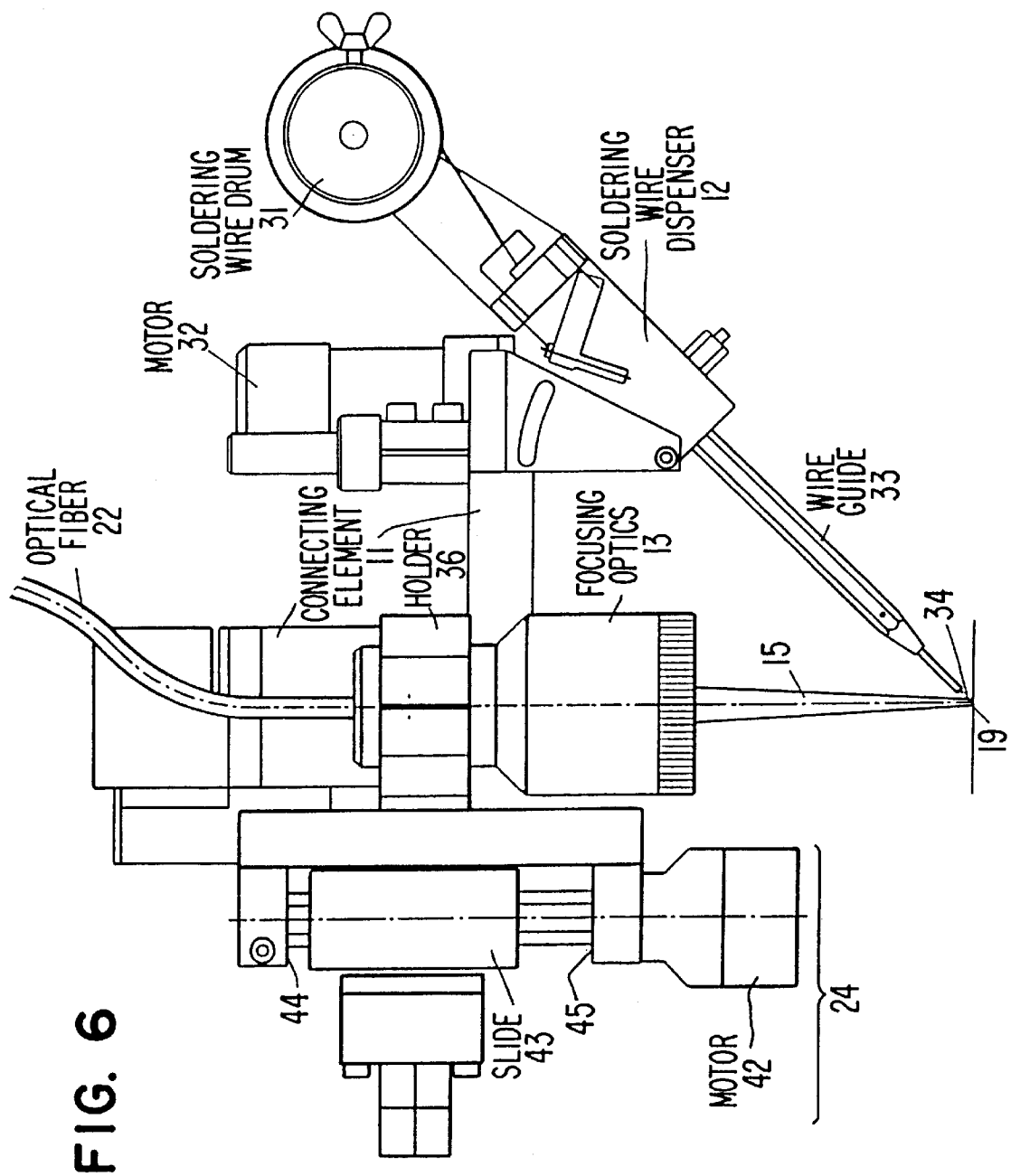
FIG. 6 shows a second embodiment of a laser soldering head.

FIG. 6 shows another embodiment of a soldering head 10. In this soldering head, actuator 24 is not a pneumatic slide but in the form of a motor slide, i.e. a slide 43 which is actuatable by a motor 42. This configuration allows to adjust any intermediate positions in the range between limitations 44 and 45. Correspondingly, the spot size of the free laser beam 15 on soldering point 19 is freely variable.

The described embodiments of soldering head 10 are simple and allow a variation of the widths f1, f2, f3 of the free laser beam 15 in the area of soldering point 19 without any movement of robot 16. The embodiments of actuator 24 described with reference to FIGS. 2 to 6 serve as examples only. Different arrangements are absolutely possible, e.g. using a motor-driven screw, a rack gear etc.

In the shown embodiments, the movement of actuator 24 increases the distance between focusing optics 13 and soldering point 19, so that the focal point of free laser beam 15 lies between said optics and soldering point 19. It is absolutely possible alternatively to reduce the distance between focusing optics 13 and soldering point 19. However, this will shift the focal point to the inside of workpiece 18, which is rather disadvantageous in comparison to the shown conditions.

We claim:

1. A soldering head for use in conjunction with a robot as an automatic soldering installation, the soldering head comprising:

a soldering wire dispenser;

a focusing optic for a laser beam;

a connecting element for mechanically connecting said soldering wire dispenser and said focusing optic in such a manner that the end of a soldering wire output from said soldering wire dispenser is in the area of the free, focused laser beam and that the area of the free, focused laser beam and the end of the soldering wire are positionable by said robot in the area of a respective soldering point;

an actuator, which is independent from said robot, for allowing a variation of the geometrical relationship between the end of the soldering wire and said focusing optic; and a controller for controlling said actuator to adapt the spot size, which is illuminated by the laser beam, to the size of the respective soldering point.

2. The soldering head of claim 1, wherein said actuator is connected to said connecting element, and said focusing optic is fixed at said actuator in such a manner that said focusing optic is displaceable with respect to said connecting element in parallel to the optical axis of said focusing optic.

3. The soldering head of claim 2, wherein said actuator is displaceable continuously within a given range.

4. The soldering head of claim 3, wherein said actuator comprises a motor-driven slide.

5. The soldering head of claim 2, wherein said actuator is displaceable discontinuously between at least two end positions.

6. The soldering head of claim 5, wherein said actuator comprises at least one pneumatic slide which has two supervised end positions.

7. The soldering head of claim 6, wherein said actuator comprises two or more pneumatic slides which are controllably staggered.

8. The soldering head of claim 2, wherein a pivot is provided around which said focusing optic, in connection with said actuator, is turnable with regard to said connecting element.

* * * * *